(No Model.)
J. MACTEAR.
SOLDERING TOOL.
No. 316,278. Patented Apr. 21, 1885.
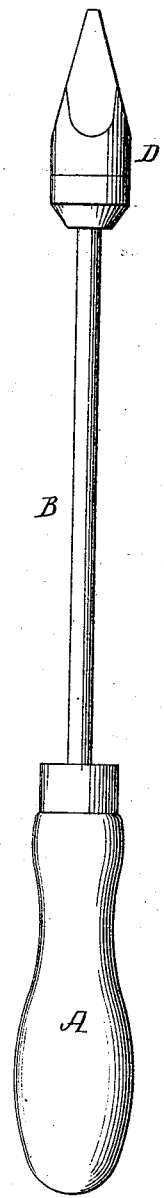
Witnesses:
Harry Drury
John M. Clayton
Inventor:
James Mactear
by his Attorneys
Howson & Sons

UNITED STATES PATENT OFFICE.

JAMES MACTEAR, OF GLASGOW, SCOTLAND.

SOLDERING-TOOL.

SPECIFICATION forming part of Letters Patent No. 316,278, dated April 21, 1885.

Application filed September 29, 1884. (No model.)

*To all whom it may concern:*

Be it known that I, JAMES MACTEAR, a subject of the Queen of Great Britain and Ireland, and a resident of Glasgow, Scotland, have invented certain Improvements in Soldering-Tools, of which the following is a specification.

The object of my invention is to construct a soldering tool or bolt which will be more durable than those of ordinary construction; and this object I attain by employing nickel in making the tip of the tool, as fully described, and claimed hereinafter.

My invention may be applied to any of the known forms of soldering-tool, the figure in the accompanying drawing representing one of the simplest forms, in which—

A is the non-conducting handle, B is the shank, and D is the tip or tool-point for melting and carrying the solder.

In all cases this tip has been made of copper as the only metal capable of alloying with the solder and retaining the tinned surface and heat for a sufficient length of time for practical purposes; but the employment of copper for this purpose carries the objection with it that in practical use the solder forms fusible bronzes with the copper, causing the rapid destruction or deterioration of the tip. In order to prevent this destructive formation of fusible bronzes, I make the point or tip D wholly or principally of nickel, which is not destructively affected by contact with the solder, as copper is.

In practice, the body of the tip may be made of copper, which I then coat with nickel by any convenient method, the essential point being to provide a sufficient surface of nickel to come into contact with the solder to practically prevent the formation of the destructive fusible bronzes.

I claim as my invention—

1. As a new article of manufacture, a soldering-tool provided with a tip having a surface of nickel, as and for the purpose set forth.

2. As a new article of manufacture, a soldering-tool having a tip composed of copper with a nickel surface, as described.

In testimony whereof I have signed my name to this specification in the presence of two subscribing witnesses.

JAMES MACTEAR.

Witnesses:
 HARRY SMITH,
 HENRY HOWSON, Jr.